(No Model.)
Z. T. HALL.
FRYING PAN.
No. 559,172.  Patented Apr. 28, 1896.
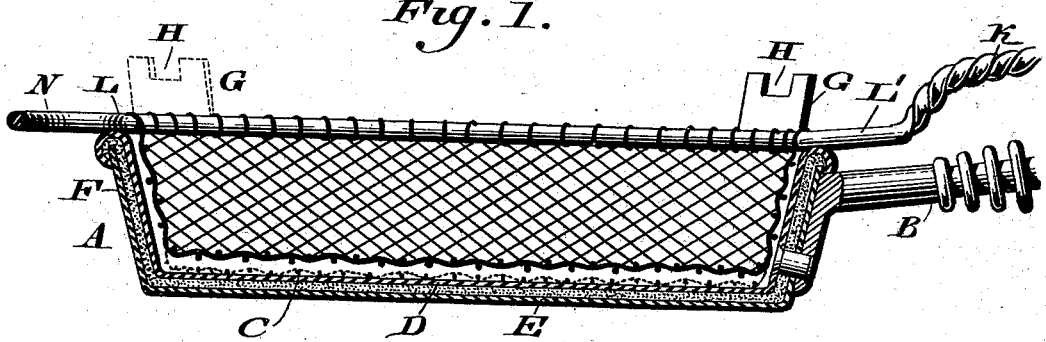
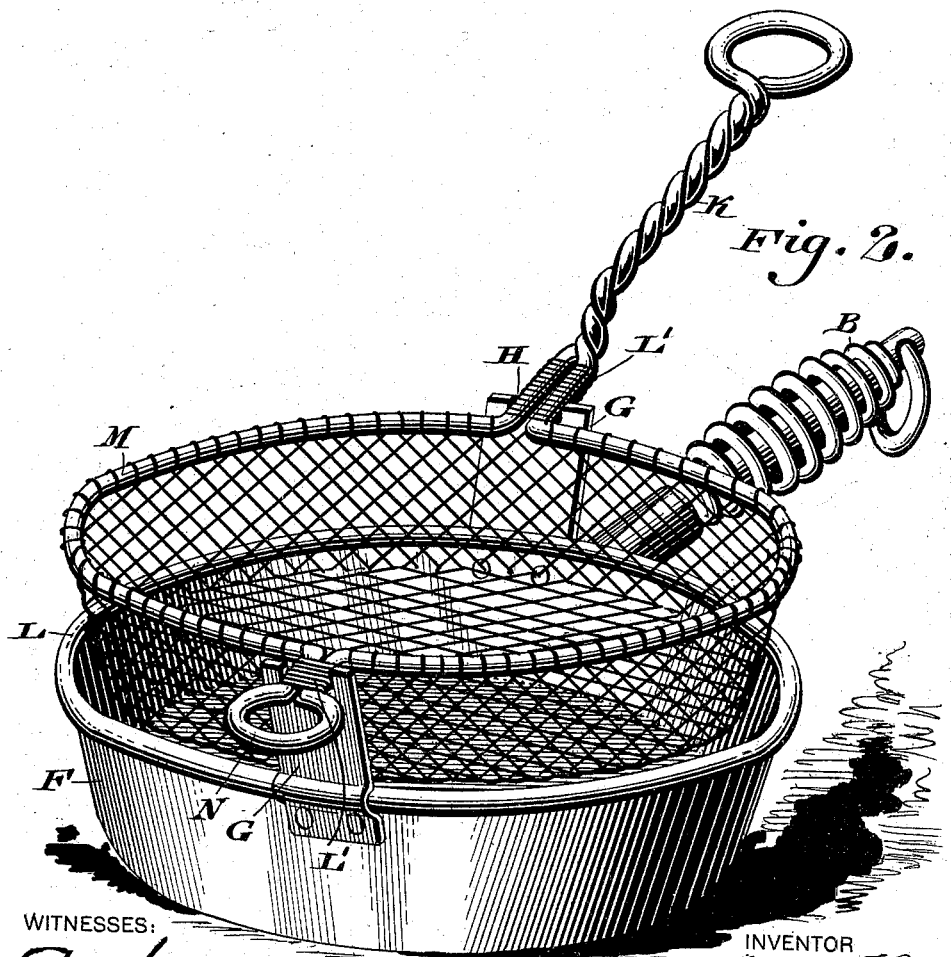
WITNESSES:
INVENTOR
Zachary T. Hall
BY
Joshua Pedersheim
ATTORNEY.

UNITED STATES PATENT OFFICE.

ZACHARY T. HALL, OF PHILADELPHIA, PENNSYLVANIA.

FRYING-PAN.

SPECIFICATION forming part of Letters Patent No. 559,172, dated April 28, 1896.

Application filed November 2, 1895. Serial No. 567,681. (No model.)

*To all whom it may concern:*

Be it known that I, ZACHARY T. HALL, a citizen of the United States, residing in the city and county of Philadelphia, State of Pennsylvania, have invented a new and useful Improvement in Frying-Pans, which improvement is fully set forth in the following specification and accompanying drawings.

My invention consists of a frying-pan which is provided with columns for supporting an open-work basket in elevated position, for draining the latter, ceasing the frying operation, or other purposes requiring the same, the basket being also adapted to be supported on the rim of the pan while the frying is being accomplished.

Figure 1 represents a partial vertical section and partial side elevation of a frying-pan embodying my invention. Fig. 2 represents a perspective view thereof, the basket being in elevated position.

Similar letters of reference indicate corresponding parts in the two figures.

Referring to the drawings, A designates a frying-pan, which is provided with the handle B and a false bottom C, between which latter and the bottom proper, D, is interposed a sheet E of asbestos or other suitable material for preventing the burning or scorching of the contents of the pan, which sheet may, however, be omitted, if desired.

Rising from the side wall F of the pan are columns G, in whose upper ends are the recesses H, said columns being disposed opposite to each other.

J designates a basket, of open-work, formed, preferably, of woven wire, the same having a handle K, and opposite thereto the outwardly-projecting arm L, which latter in the present case is formed of the wire of which the rim M of the basket is constructed.

The handle employed is known as a "cold" handle, the same preventing burning of the hands of the one grasping the same.

It will be seen that the basket is primarily set into the pan sustained on the rim thereof, and the frying conducted as usual. When the work is accomplished, the basket is raised, and the arm L and inner end L' of the handle K, also acting as an arm, are seated upon the columns G, whereby it is held above the bottom of the pan or removed from the fat or frying material, thus ceasing the frying or preventing burning or scorching and permitting the basket and the contents thereof to drain, it being noticed that the basket may be manipulated by the handle K in a most convenient manner, the hand being removed from over the pan and the frying material therein, the advantage of which is evident.

The outer end of the arm L is enlarged or formed with the knob N, which also serves as a shoulder for preventing displacement of the arm from its supporting-prop, said arm and portion L' of the handle being made somewhat flat, and the walls of the recesses H being angular, so that lateral displacement and swinging of the basket from and on the columns are prevented.

Having thus described my invention, what I claim as new, and desire to secure by Letters Patent, is—

The combination of a frying-pan provided with columns, and a basket having a handle and an arm, said handle and arm being adapted to support the basket on the rim of the said pan or above the same on said columns, substantially as described.

ZACHARY T. HALL.

Witnesses:
JOHN A. WIEDERSHEIM,
WM. C. WIEDERSHEIM.